Figure 1:
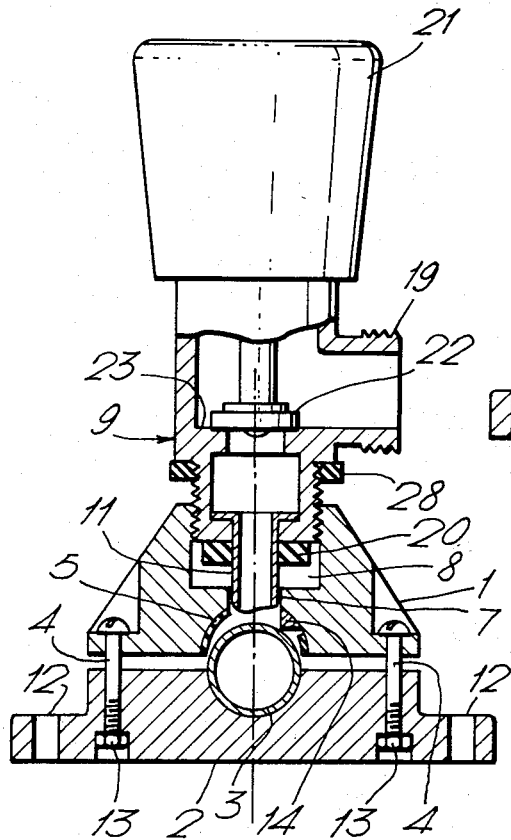

United States Patent [19]
Croxford et al.

[11] Patent Number: 4,540,011
[45] Date of Patent: Sep. 10, 1985

[54] METHOD AND DEVICE FOR FORMING A BRANCH CONNECTION IN A PIPE

[75] Inventors: George A. Croxford; Anthony M. Hackett, both of Peterborough, England

[73] Assignee: Hotpoint Limited, England

[21] Appl. No.: 524,371

[22] Filed: Aug. 18, 1983

[30] Foreign Application Priority Data

Aug. 25, 1982 [GB] United Kingdom ............... 8224433

[51] Int. Cl.³ ............................................. F16K 43/00
[52] U.S. Cl. ............................ 137/15; 29/157.1 R; 72/71; 72/325; 137/318; 285/197
[58] Field of Search ............... 29/157.1 R; 72/70, 71, 72/325; 137/1, 15, 318; 285/197, 198

[56] References Cited

U.S. PATENT DOCUMENTS

| | | | |
|---|---|---|---|
| 2,310,083 | 2/1943 | Holmes et al. | 72/325 |
| 3,162,211 | 12/1964 | Barusch | 137/318 |
| 3,240,226 | 3/1966 | Burkholder | 137/318 |
| 3,394,727 | 7/1968 | Wagner | 137/318 |
| 3,448,779 | 6/1969 | Horwitt | 137/318 |
| 3,495,615 | 2/1970 | Ehrens et al. | 137/318 |
| 3,554,217 | 1/1971 | Ehrens et al. | 137/318 |
| 3,580,269 | 5/1971 | Ehrens et al. | 137/318 |
| 3,714,959 | 2/1973 | Pignataro, Jr. | 137/318 |
| 4,034,777 | 7/1977 | Gebelius | 137/318 |
| 4,364,406 | 12/1982 | Bohlin | 72/325 |

FOREIGN PATENT DOCUMENTS

| | | |
|---|---|---|
| 1498263 | 1/1978 | United Kingdom . |
| 2003570 | 1/1982 | United Kingdom . |

Primary Examiner—George L. Walton
Attorney, Agent, or Firm—Kirschstein, Kirschstein, Ottinger & Israel

[57] ABSTRACT

In a method of forming a branch connection in a fluid carrying pipe (3) by attaching to the pipe (3) a saddle unit (1) incorporating a cutting member (11) capable of being operated to cut a hole in the pipe wall, the cut is effected so that it extends only partly around the circumference of a circle so as to form a tongue (18), and the tongue is bent into the pipe while remaining connected to the adjoining part of the pipe wall.

17 Claims, 8 Drawing Figures

U.S. Patent Sep. 10, 1985 Sheet 1 of 2 4,540,011

METHOD AND DEVICE FOR FORMING A BRANCH CONNECTION IN A PIPE

This invention relates to a method of and a device for forming branch connections in fluid carrying pipes, more especially, though not exclusively, domestic water pipes.

One method of forming a branch connection in such a pipe involves shutting off the water supply and draining the system, drilling a hole in the wall of the pipe, and clamping a saddle unit to the pipe over the hole so formed with a resilient gasket interposed between the surfaces of the saddle unit and pipe to form a fluid-tight seal, the saddle unit being provided with means for connecting a branch pipe thereto, and having a passage for the flow of water between the hole in the main pipe and the branch pipe.

However it is not always convenient or desirable to cut off the water or drain the system and in an alternative method which has been proposed the saddle unit is itself provided with a cutting member which can be operated, once the unit has been clamped to an undrilled pipe, to cut a circular hole in the wall of the pipe for the passage of water from the pipe to the branch connection; such a method as carried out hitherto, whilst it can be carried out without cutting off the water supply, also suffers from a drawback in that the circular slug cut from the wall of the pipe is deposited within the interior of the pipe, and could in some cases be carried into a position in which it seriously interferes with the flow of water.

An object of the present invention is to provide a method and apparatus for forming a branch connection in a pipe which avoids the above disadvantages, and whilst it is mainly concerned with the formation of branch connections in domestic water pipes it could also have other applications.

According to one aspect of the invention, in a method of forming a branch connection in a fluid carrying pipe by attaching to the pipe a saddle unit incorporating a cutting member capable of being operated to cut into the pipe wall, the cut is effected so that it extends only partly around the circumference of a circle so as to form a tongue, and the tongue is bent into the pipe whilst remaining connected to the adjoining part of the pipe wall.

Preferably the cutting member is simultaneously rotated and driven inwards through the pipe wall, with its cutting edge or edges spaced from its axis of rotation, and is prevented from cutting a completely circular hole in the pipe wall, either by initially forming a depression in the part of the pipe wall traversed by the cutting edge or edges or by offsetting the axis of rotation of the cutting member from the axis of the pipe. By this means a web of material is left when the remaining part-circular section of the wall is cut through and continued inward movement of the cutting member urges the tongue so formed into the pipe.

The invention has the advantage that the connection can be formed automatically on attachment of the saddle unit to the pipe, without the need for cutting off the water supply, and without a loose slug of metal passing into the interior of the pipe.

The saddle unit can have any convenient construction capable of being secured to the pipe to which the branch connection is to be made and such that a fluid-tight seal can be formed between the adjacent pipe and saddle unit surfaces, with or without the need for an intervening gasket.

The invention also relates to devices for carrying out such a method.

According, therefore, to another aspect of the invention, a device for forming a branch connection in a pipe comprises a saddle unit having a fluid passage in it and arranged to be secured to the surface of the pipe with an end of said passage closed by said pipe surface when the unit is attached thereto, sealing means for forming a fluid-tight seal between the surface of the pipe and the adjacent surface of the unit around said end of the passage, a cutting member capable of rotation about an axis transverse to the pipe and of simultaneous movement inwards towards the pipe axis for progressively cutting through the wall of the pipe around a circular path, with a relatively small part of the wall around said path spaced further from the cutting edge of the tool than the remainder such that operation of the cutting tool results in the formation of a part-circular tongue joined to the remainder of the pipe wall by a narrower web, and such that further movement of the cutting tool depresses the tongue inwards while leaving it attached to the pipe wall by said web.

Preferably the device includes a backing member securable to the saddle unit by means of screws, bolts or the like such that the pipe can be clamped between them. Both the saddle unit and backing member are conveniently formed of a relatively rigid moulded plastics material. Alternatively, die-cast components may be used.

The backing member may comprise a bracket securable to a wall or other support, the bracket and saddle unit preferably being formed with semi-cylindrical grooves for accommodating the pipe.

The saddle unit may incorporate a spigot within said groove such that when the unit is clamped to the pipe it forms a depression in the pipe wall under the path of the cutting edge or edges of the cutting member, the depression preferably being disposed under part of the path near to the side of the pipe. The spigot in such a case can be formed of any convenient material carried by the saddle unit, although where the latter is formed of a suitable material it may be provided by a projection integral with the unit.

Preferably, however, the cutting member is disposed with its axis of rotation offset from the axis of the pipe.

In each case the cutting through of the pipe wall leaves a narrow web within the depression on the one hand, and at the side of the pipe towards which the cutting tool is offset on the other hand, unsevered, and this allows the tongue of metal subsequently to be pressed into the pipe without being parted completely from the pipe.

The saddle unit may incorporate a manually adjustable valve for controlling the flow of fluid from the pipe into the branch connection in use, the valve body in such a case preferably being securable to the saddle unit by screw threads, and the valve body carrying the cutting member such that as it is screwed into the saddle unit it produces the rotational and inward movement of the cutting member.

Figure 2:
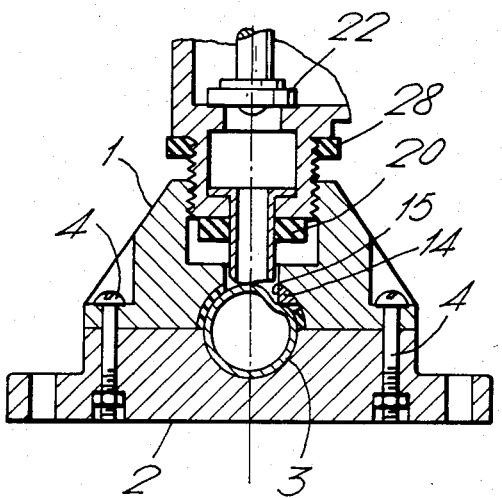
Figure 3:
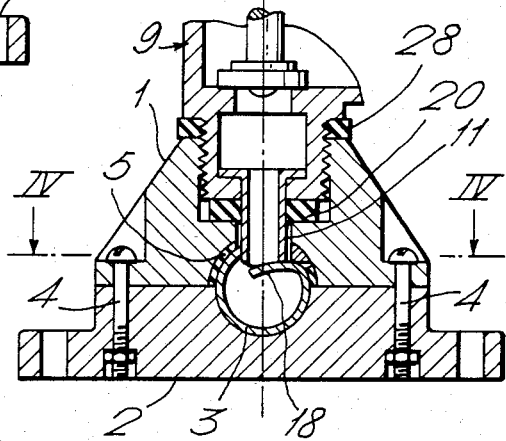
Figure 4:
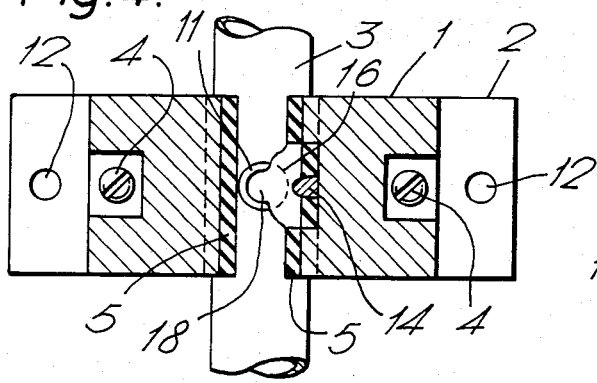
Figure 4A:
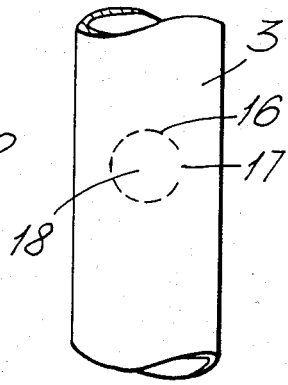

Two different embodiments of the invention will now be described by way of example with reference to FIGS. 1 to 6 of the accompanying schematic drawings in which:

FIGS. 1 to 3 represent transverse sections through one device for forming a branch connection on a domestic water pipe, for example for feeding a washing machine, in different stages of forming the connection, FIG. 4 represents a plan section in the plane represented by the line IV—IV of FIG. 3, FIG. 4A illustrates an enlarged view of the pipe showing a tongue formed in the wall thereof by the device of FIGS. 1 to 4.

Figure 5:
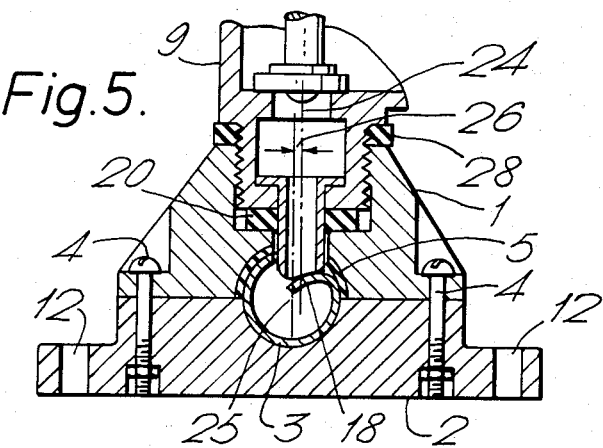
Figure 6:
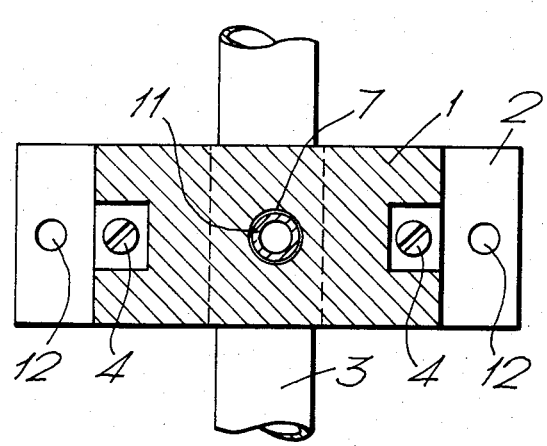
Figure 6A:
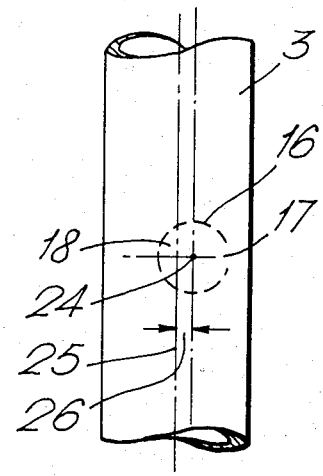

FIGS. 5 and 6 illustrate a transverse section and a plan section of the second device, FIG. 6A illustrates a view similar to FIG. 4A of the pipe showing a tongue formed by the device of FIGS. 5 and 6.

Referring first to FIGS. 1 to 4, the 35 device illustrated therein comprises a saddle unit 1 and a bracket member 2 each formed with a semi-circular groove appropriate to the dimensions of the pipe 3 to which the branch connection is to be made, and arranged to be clamped to each other around the required region of the pipe by means of a pair of screws 4, a gasket 5 of rubber or other suitable resilient material being provided between the surface of the pipe and the groove in the saddle to form a fluid-tight seal between them.

The saddle unit 1 is formed with a passage which extends radially with respect to the pipe axis, the inner and outer ends of the passage being of smaller and larger diameter respectively, the outer end 8 being internally threaded, and carrying an externally threaded valve unit 9. This carries coaxially at its inner end a hardened steel tubular cutting member 11 which projects into the narrower part 7 of the passage, and whose cutting end can be caused to extend through the passage and engage and progressively cut through the wall of the pipe as the valve body 9 is screwed into the saddle unit.

In use, the bracket member 2 is first attached to a wall or other support by means of screws (not shown) passing through holes 12 in the bracket, in order to provide a firm foundation for the pipe 3, a packing piece being utilised if necessary in order to ensure that the pipe seats centrally in the groove.

The saddle unit 1 is then secured to the bracket 2, with the valve and cutter assembly retracted as in FIG. 1, by the tightening of the screws 4 into captive nuts 13. During this process a relatively narrow, hardened metal projection 14 located within the groove of the saddle unit 1 to one side of the passage 7 engages the wall of the pipe 3 and forms a depression as at 15 (FIG. 2) as the screws 4 are tightened.

The valve unit 9 is then screwed firmly into the saddle unit 1, during which process the resultant rotation and simultaneous inward movement of the cutter 11 causes it to cut through the pipe wall. Because of the depression 15 formed in the pipe 3 by the projection 14 the cutter does not initially make contact with the pipe wall at this position and accordingly, although it makes an almost completely circular cut in the position as indicated by the broken line 16 in FIG. 4 and the enlarged view of the pipe in FIG. 4A, it leaves a narrow web 17 uncut. Further screwing-in of the valve unit 9 causes the almost circular tongue 18 formed by the cutter to be bent inwards as shown in FIG. 3 but it still remains joined to the remainder of the pipe by the web 17. The tongue 18 protrudes into the pipe 3 without significantly interfering with the water flow, and the introduction of a loose slug of metal into the pipe is avoided. A compressible washer 20 ensures an adequate fluid seal between the valve unit 9 and the saddle unit 1 before the penetration of the pipe wall by the cutting tool 11.

A locknut 28 is provided in the main threaded stem of the valve unit to lock it in a required position relative to the saddle unit following the penetration of the pipe 3.

The valve unit 9, which can have any convenient construction, is shown provided with a threaded outlet 19 to which a branch pipe may be coupled, and a manually operable control knob 21 which can be rotated in known manner to adjust the position of the valve washer 22 relative to its seating 23.

The second device illustrated in FIGS. 5 and 6 is similar to that described with reference to FIGS. 1 to 4, except that the projection 14 is omitted, and instead of the passages 7, 8 in the valve unit 9 being disposed with its axis 24 cutting the pipe axis 25 it is offset therefrom by a small distance 26 (FIG. 5).

Then in use when the valve unit 9 is screwed into the saddle unit 1 causing the tubular cutting tool 11 to cut into the pipe, it again cuts only a part of a complete circle to leave a tongue 18 joined to the remainder of the pipe wall by a narrow web 17 (see also FIG. 6A). Further screwing-in of the valve unit 9 causes the cutting tool to depress the tongue 18 so formed into the pipe without severing it from the pipe as in the embodiment previously described.

Although in each of the embodiments described the device incorporates a manual control valve for controlling the flow of water from the main pipe 3 to a branch pipe, it will be understood that the invention may be utilised to form branch connections which do not require such valves.

Moreover apart from forming branch connections in domestic water pipes it can be utilised for forming connections in other pipes capable of being penetrated by a rotating cutter, where it is undesirable to cut-off the supply of fluid within the pipes when making the connection.

Whilst the cutter 11 in both embodiments has been shown as cylindrical its cutting end could, in some cases be slightly tapered, as this could facilitate the depression of the formed tongue 18 by the cutter.

We claim:

1. A device for forming a branch connection in a pipe, the device comprising:
    (a) a saddle member having a fluid passage in it and arranged to be secured to the surface of the pipe with an end of the passage closed by said pipe surface when the saddle member is placed thereon, said saddle member having a groove therein for longitudinal reception of a portion of the length of the pipe;
    (b) sealing means for forming a fluid-tight seal between the surface of the pipe and the adjacent surface of the saddle member around the end of the passage;
    (c) a backing member having a groove therein for longitudinal reception of a portion of the length of the pipe, the groove in the backing member opposing the groove in the saddle member with said portion of the pipe received in said grooves;
    (d) means to urge the saddle member and backing member toward one another with the portion of the pipe received in the opposed grooves,
    (e) a cutting element carried by one of said members and capable of rotation relative to such member about an axis transverse to the pipe axis, said cutting element having a cutting edge offset from said axis of rotation, said cutting element being further capable of simultaneous movement toward the axis of the pipe causing said cutting edge to progressively cut through the wall of the pipe in a circular path;

(f) said one member including means to depress a portion of the pipe in said path once its saddle member and backing member are urged together so that as the cutting edge progressively cuts around said path it will cut from a beginning at one point on said path to an end at another point on said path spaced from said first point, with a relatively small part of said wall uncut to form a part-circular tongue joined to the remainder of the pipe wall by a narrow web between said points;

(g) the cutting element being capable, on further movement toward said pipe axis, of depressing the tongue inwardly while leaving it attached to the remainder of the pipe by the narrow web.

2. A device as set forth in claim 1, wherein the cutting element is tubular and has the cutting edge thereof at an open end of the same so that the device provides a branch connection with the interior of the pipe upon depressing of the tongue inwardly and so that the depressed tongue is not freely deposited in the interior of the pipe where it might interfere with the flow of fluid through the pipe.

3. A device according to claim 1, wherein both members are formed of a relatively rigid molded plastic material.

4. A device according to claim 1, wherein the saddle member includes a spigot within the groove of the saddle member such that when the two members are urged together the spigot forms a depression in the pipe wall under the path of the cutting edge of the cutting element.

5. A device according to claim 4, wherein the spigot is so located that it forms the depression under part of the path near to the side of the pipe.

6. A device according to claim 4, wherein the spigot is constituted by a projection integral with the saddle member.

7. A device according to claim 1, wherein the saddle member includes a valve for controlling the flow of the liquid from the pipe into the branch connection in use.

8. A device according to claim 7, wherein the body of the valve is securable to the saddle member by screw threads.

9. A device according to claim 8, wherein the valve body carries the cutting element such that as the valve body is secured to the saddle member it produces the rotational and inward movement of the cutting element.

10. A device for forming a branch connection in a pipe, the device comprising:

(a) a saddle member having a fluid passage in it and arranged to be secured to the surface of the pipe with an end of the fluid passage closed by said pipe surface when the saddle member is placed thereon, said saddle member having a groove therein for longitudinal reception of a portion of the length of the pipe;

(b) sealing means for forming a fluid-tight seal between the surface of the pipe and the adjacent surface of the saddle member around the end of the passage;

(c) a backing member having a groove therein for longitudinal reception of a portion of the length of the pipe, the groove in the backing member opposing the groove in the saddle member with said portion of the pipe received in the opposed grooves;

(d) means to urge the saddle member and backing member toward one another with the portion of the pipe received in the opposed grooves;

(e) a cutting element carried by one of the members and capable of rotation relative to such member about an axis transverse to the pipe axis, said cutting element having a cutting edge offset from said axis of rotation, said cutting element being further capable of simultaneous movement toward the axis of the pipe for causing said cutting edge to progressively cut through the wall of the pipe in a circular path;

(f) said axis of rotation of said cutting element being spaced from said pipe axis so that as said cutting edge progressively cuts around said path, it will cut from a beginning at one point on said path to an end at another point on said path spaced from first point, with a relatively small part of said wall uncut to form a part-circular tongue joined to the pipe wall by a narrow web between said points, the cutting edge accordingly forming a cut in the pipe which starts at the side thereof at which the axis of rotation of the cutting element is spaced from the pipe axis, and continues through the pipe wall and exits the pipe at the same side thereof, but spaced from the entry to the cut;

(g) the cutting element being capable, on further movement toward said pipe axis, of depressing the tongue inwardly while leaving it attached to the remainder of the pipe by the narrow web.

11. A device as set forth in claim 10, wherein the cutting element is tubular and has the cutting edge thereof at an open end of the same, so that the device provides a branch connection with the interior of the pipe upon depressing of the tongue inwardly and so that the depressed tongue is not freely deposited in the interior of the pipe where it might interfere with the flow of fluid through the pipe.

12. A device according to claim 10, wherein both members are formed of a relatively rigid molded plastic material.

13. A device according to claim 10, wherein the saddle member incorporates a valve for controlling the flow of the liquid from the pipe into the branch connection in use.

14. A device according to claim 13, wherein the body of the valve is securable to the saddle member by screw threads.

15. A device according to claim 14, wherein the valve body carries the cutting element such that as the valve body is screwed into the saddle member it produces the rotational and inward movement of the cutting element.

16. A method of forming a branch connection in a fluid carrying pipe by squeezing a longitudinal portion of the pipe between a groove in a saddle member and an opposed groove in a backing member and turning in one of said members a cutting element sealingly rotatable in a fluid passageway in that member, the cutting element being turned about an axis transverse to the pipe axis, the cutting element having a cutting edge spaced from the axis of rotation of the cutting element and the cutting element simultaneously moving toward the axis of the pipe as it rotates forcing the cutting edge to progressively cut through the wall of the pipe in a circular path, the axis of rotation of said cutting element being offset from said pipe axis so that as the cutting edge progressively cuts around the path it will cut from a beginning at one point on said path to an end on another point on said path spaced from said first point with a relatively small part of said wall uncut to form a part-circular tongue joined to the remainder of the pipe wall by a narrow web between said points, the cutting edge accordingly forming a cut in the pipe which starts at the side thereof at which the axis of rotation of the cutting element is spaced from the pipe axis, and continues through the pipe wall and exits the pipe at the same side thereof, but spaced from the entry to the cut, further operation of the cutting element depressing the tongue inwardly while leaving the tongue attached to the pipe by said narrow web.

17. A method of forming a branch connection in a fluid carrying pipe by squeezing a longitudinal portion of the pipe between a groove in a saddle member and an opposed groove in a backing member such that a portion of the pipe is depressed, and turning in one of said members a cutting element sealingly rotatable in a fluid passageway in that member, the cutting element being turned about an axis transverse to the pipe axis, the cutting element having a cutting edge offset from the axis of rotation of the cutting element, and the cutting element simultaneously moving toward the axis of the pipe as it rotates, forcing the cutting edge to progressively cut through the wall of the pipe in a circular path, the depressed portion of the pipe being in said path, so that as the cutting edge progressively cuts around said path it will cut from a beginning at one point on said path to an end at another point on said path spaced from said first point with a relatively small part of said wall uncut to form a part-circular tongue joined to the remainder of the pipe wall by a narrow web between said points, further operation of the cutting element depressing the tongue inwardly while leaving the tongue attached to the pipe by said narrow web.

* * * * *